US011268881B2

(12) United States Patent
Finn et al.

(10) Patent No.: US 11,268,881 B2
(45) Date of Patent: Mar. 8, 2022

(54) SYSTEM AND METHOD FOR FAN BLADE ROTOR DISK AND GEAR INSPECTION

(71) Applicant: United Technologies Corporation, Farmington, CT (US)

(72) Inventors: Alan Matthew Finn, Hebron, CT (US); Ziyou Xiong, Wethersfield, CT (US); Richard W. Osborne, III, Stafford Springs, CT (US); Ozgur Erdinc, Mansfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 131 days.

(21) Appl. No.: 15/971,194

(22) Filed: May 4, 2018

(65) Prior Publication Data

US 2019/0339165 A1  Nov. 7, 2019

(51) Int. Cl.

| G01M 15/14 | (2006.01) |
|---|---|
| G06T 7/00 | (2017.01) |
| F01D 5/14 | (2006.01) |
| G01N 21/95 | (2006.01) |

(52) U.S. Cl.
CPC ............ G01M 15/14 (2013.01); F01D 5/141 (2013.01); G01N 21/9515 (2013.01); G06T 7/001 (2013.01); G06T 7/0008 (2013.01); F05D 2220/32 (2013.01); F05D 2220/36 (2013.01); F05D 2230/72 (2013.01); F05D 2270/8041 (2013.01); G06T 2207/30164 (2013.01)

(58) Field of Classification Search
CPC ........... G06T 7/001; G06T 2207/30164; G06T 2207/30108; G06T 2207/30168; G06T 3/4038; G06T 7/0008; G01M 15/14; F01D 5/141; G01N 21/9515; F05D 2220/32; F05D 2270/8041; F05D 2230/72; F05D 2220/36
See application file for complete search history.

(56) References Cited

U.S. PATENT DOCUMENTS

| 3,804,397 A | 4/1974 | Neumann |
|---|---|---|
| 4,402,053 A | 8/1983 | Kelley et al. |
| 4,403,294 A | 9/1983 | Hamada et al. |
| 4,873,651 A | 10/1989 | Raviv |

(Continued)

FOREIGN PATENT DOCUMENTS

| CA | 2820732 A1 | 12/2014 |
|---|---|---|
| DE | 19710743 A1 | 9/1998 |

(Continued)

OTHER PUBLICATIONS

Wang et al., "Fabric defect detection based on improved low-rank and sparse matrix decomposition", 2017 IEEE International Conference on Image Processing (ICIP), Sep. 2017, p. 2776-2780 (Year: 2017).*

(Continued)

*Primary Examiner* — Kenny A Cese
(74) *Attorney, Agent, or Firm* — Bachman & LaPointe, P.C.

(57) ABSTRACT

A system for component inspection comprising at least one sensor configured to capture sensor data of the component; and a processor coupled to the at least one sensor, the processor comprising at least one model configured to separate the sensor data into a normal category and an abnormal category.

16 Claims, 4 Drawing Sheets

(56) References Cited

U.S. PATENT DOCUMENTS

| | | |
|---|---|---|
| 5,064,291 A | 11/1991 | Reiser |
| 5,119,678 A | 6/1992 | Bashyam et al. |
| 5,345,514 A | 9/1994 | Mahdavieh et al. |
| 5,345,515 A | 9/1994 | Nishi et al. |
| 5,351,078 A | 9/1994 | Lemelson |
| 5,963,328 A | 10/1999 | Yoshida et al. |
| 6,023,637 A | 2/2000 | Liu et al. |
| 6,153,889 A | 11/2000 | Jones |
| 6,177,682 B1 | 1/2001 | Bartulovic et al. |
| 6,271,520 B1 | 8/2001 | Tao et al. |
| 6,399,948 B1 | 6/2002 | Thomas |
| 6,434,267 B1 | 8/2002 | Smith |
| 6,462,813 B1 | 10/2002 | Haven et al. |
| 6,690,016 B1 | 2/2004 | Watkins et al. |
| 6,737,648 B2 | 5/2004 | Fedder et al. |
| 6,759,659 B2 | 7/2004 | Thomas et al. |
| 6,804,622 B2 | 10/2004 | Bunker et al. |
| 6,907,358 B2 | 6/2005 | Suh et al. |
| 6,965,120 B1 | 10/2005 | Beyerer et al. |
| 7,026,811 B2 | 4/2006 | Roney, Jr. et al. |
| 7,064,330 B2 | 6/2006 | Raulerson et al. |
| 7,119,338 B2 | 10/2006 | Thompson et al. |
| 7,122,801 B2 | 10/2006 | Favro et al. |
| 7,129,492 B2 | 10/2006 | Saito et al. |
| 7,164,146 B2 | 1/2007 | Weir et al. |
| 7,190,162 B2 | 3/2007 | Tenley et al. |
| 7,220,966 B2 | 5/2007 | Saito et al. |
| 7,233,867 B2 | 6/2007 | Pisupati et al. |
| 7,240,556 B2 | 7/2007 | Georgeson et al. |
| 7,272,529 B2 | 9/2007 | Hogan et al. |
| 7,313,961 B2 | 1/2008 | Tenley et al. |
| 7,415,882 B2 | 8/2008 | Fetzer et al. |
| 7,446,886 B2 | 11/2008 | Aufmuth et al. |
| 7,602,963 B2 | 10/2009 | Nightingale et al. |
| 7,689,030 B2 | 3/2010 | Suh et al. |
| 7,724,925 B2 | 5/2010 | Shepard |
| 7,738,725 B2 | 6/2010 | Raskar et al. |
| 7,823,451 B2 | 11/2010 | Sarr |
| 7,966,883 B2 | 6/2011 | Lorraine et al. |
| 8,050,491 B2 | 11/2011 | Vaidyanathan |
| 8,204,294 B2 | 6/2012 | Alloo et al. |
| 8,208,711 B2 | 6/2012 | Venkatachalam et al. |
| 8,221,825 B2 | 7/2012 | Reitz et al. |
| 8,239,424 B2 | 8/2012 | Haigh et al. |
| 8,431,917 B2 | 4/2013 | Wang et al. |
| 8,449,176 B2 | 5/2013 | Shepard |
| 8,520,931 B2 | 8/2013 | Tateno |
| 8,528,317 B2 | 9/2013 | Gerez et al. |
| 8,692,887 B2 | 4/2014 | Ringermacher et al. |
| 8,744,166 B2 | 6/2014 | Scheid et al. |
| 8,761,490 B2 | 6/2014 | Scheid et al. |
| 8,781,209 B2 | 7/2014 | Scheid et al. |
| 8,792,705 B2 | 7/2014 | Scheid et al. |
| 8,913,825 B2 | 12/2014 | Taguchi et al. |
| 8,983,794 B1 | 3/2015 | Motzer et al. |
| 9,037,381 B2 | 5/2015 | Care |
| 9,046,497 B2 | 6/2015 | Kush et al. |
| 9,066,028 B1 | 6/2015 | Koshti |
| 9,080,453 B2 | 7/2015 | Shepard et al. |
| 9,116,071 B2 | 8/2015 | Hatcher, Jr. et al. |
| 9,134,280 B2 | 9/2015 | Cataldo et al. |
| 9,146,205 B2 | 9/2015 | Renshaw et al. |
| 9,151,698 B2 | 10/2015 | Jahnke et al. |
| 9,240,049 B2 * | 1/2016 | Ciurea ................... G06T 7/557 |
| 9,251,582 B2 | 2/2016 | Lim et al. |
| 9,300,865 B2 | 3/2016 | Wang et al. |
| 9,305,345 B2 | 4/2016 | Lim et al. |
| 9,458,735 B1 | 10/2016 | Diwinsky et al. |
| 9,465,385 B2 | 10/2016 | Kamioka et al. |
| 9,467,628 B2 | 10/2016 | Geng et al. |
| 9,471,057 B2 | 10/2016 | Scheid et al. |
| 9,476,798 B2 | 10/2016 | Pandey et al. |
| 9,476,842 B2 | 10/2016 | Drescher et al. |
| 9,483,820 B2 | 11/2016 | Lim et al. |
| 9,488,592 B1 | 11/2016 | Maresca et al. |
| 9,519,844 B1 | 12/2016 | Thompson et al. |
| 9,594,059 B1 | 3/2017 | Brady et al. |
| 9,785,919 B2 | 10/2017 | Diwinsky et al. |
| 9,804,997 B2 | 10/2017 | Sharp et al. |
| 9,808,933 B2 | 11/2017 | Lin et al. |
| 9,981,382 B1 | 5/2018 | Strauss et al. |
| 10,438,036 B1 | 10/2019 | Reome et al. |
| 2002/0121602 A1 | 9/2002 | Thomas et al. |
| 2002/0167660 A1 | 11/2002 | Zaslavsky |
| 2003/0117395 A1 | 6/2003 | Yoon |
| 2003/0205671 A1 | 11/2003 | Thomas et al. |
| 2004/0089811 A1 | 5/2004 | Lewis et al. |
| 2004/0089812 A1 | 5/2004 | Favro et al. |
| 2004/0139805 A1 | 7/2004 | Antonelli et al. |
| 2004/0201672 A1 | 10/2004 | Varadarajan et al. |
| 2004/0240600 A1 | 12/2004 | Freyer et al. |
| 2004/0245469 A1 | 12/2004 | Favro et al. |
| 2004/0247170 A1 | 12/2004 | Furze et al. |
| 2005/0008215 A1 | 1/2005 | Shepard |
| 2005/0113060 A1 | 5/2005 | Lowery |
| 2005/0151083 A1 | 7/2005 | Favro et al. |
| 2005/0167596 A1 | 8/2005 | Rothenfusser et al. |
| 2005/0276907 A1 | 12/2005 | Harris et al. |
| 2006/0012790 A1 | 1/2006 | Furze et al. |
| 2006/0078193 A1 | 4/2006 | Brummel et al. |
| 2006/0086912 A1 | 4/2006 | Weir et al. |
| 2007/0007733 A1 | 1/2007 | Hogarth et al. |
| 2007/0017297 A1 | 1/2007 | Georgeson et al. |
| 2007/0045544 A1 | 3/2007 | Favro et al. |
| 2008/0022775 A1 | 1/2008 | Sathish et al. |
| 2008/0053234 A1 | 3/2008 | Staroselsky et al. |
| 2008/0111074 A1 | 5/2008 | Weir et al. |
| 2008/0183402 A1 | 7/2008 | Malkin et al. |
| 2008/0229834 A1 | 9/2008 | Bossi et al. |
| 2008/0247635 A1 | 10/2008 | Davis et al. |
| 2008/0247636 A1 | 10/2008 | Davis et al. |
| 2009/0000382 A1 | 1/2009 | Sathish et al. |
| 2009/0010507 A1 | 1/2009 | Geng |
| 2009/0066939 A1 | 3/2009 | Venkatachalam et al. |
| 2009/0128643 A1 | 5/2009 | Kondo et al. |
| 2009/0252987 A1 | 10/2009 | Greene, Jr. |
| 2009/0279772 A1 * | 11/2009 | Sun ........................ G06T 7/35 |
| | | 382/141 |
| 2009/0312956 A1 | 12/2009 | Zombo et al. |
| 2010/0212430 A1 | 8/2010 | Murai et al. |
| 2010/0220910 A1 * | 9/2010 | Kaucic ................... G06T 7/001 |
| | | 382/131 |
| 2011/0062339 A1 | 3/2011 | Ruhge et al. |
| 2011/0083705 A1 | 4/2011 | Stone et al. |
| 2011/0119020 A1 | 5/2011 | Key |
| 2011/0123093 A1 | 5/2011 | Alloo et al. |
| 2011/0299752 A1 | 12/2011 | Sun |
| 2011/0302694 A1 | 12/2011 | Wang et al. |
| 2012/0154599 A1 | 6/2012 | Huang |
| 2012/0188380 A1 | 7/2012 | Drescher et al. |
| 2012/0249959 A1 * | 10/2012 | You ...................... G06K 9/0061 |
| | | 351/206 |
| 2012/0275667 A1 | 11/2012 | Lu |
| 2012/0293647 A1 | 11/2012 | Singh et al. |
| 2013/0028478 A1 | 1/2013 | St-Pierre et al. |
| 2013/0041614 A1 | 2/2013 | Shepard et al. |
| 2013/0070897 A1 | 3/2013 | Jacotin |
| 2013/0113913 A1 * | 5/2013 | Scheid ................. G06T 3/4038 |
| | | 348/82 |
| 2013/0113914 A1 * | 5/2013 | Scheid ............... G01N 21/8851 |
| | | 348/82 |
| 2013/0113916 A1 * | 5/2013 | Scheid ................. G06T 7/0004 |
| | | 348/85 |
| 2013/0163849 A1 | 6/2013 | Jahnke et al. |
| 2013/0235897 A1 | 9/2013 | Bouteyre et al. |
| 2013/0250067 A1 | 9/2013 | Laxhuber et al. |
| 2014/0022357 A1 | 1/2014 | Yu et al. |
| 2014/0056507 A1 | 2/2014 | Doyle et al. |
| 2014/0098836 A1 | 4/2014 | Bird |
| 2014/0184786 A1 | 7/2014 | Georgeson et al. |
| 2014/0185912 A1 | 7/2014 | Lim et al. |
| 2014/0198185 A1 | 7/2014 | Haugen et al. |
| 2014/0200832 A1 | 7/2014 | Troy et al. |
| 2014/0350338 A1 | 11/2014 | Tanaka et al. |

(56) References Cited

U.S. PATENT DOCUMENTS

| | | | |
|---|---|---|---|
| 2015/0041654 | A1 | 2/2015 | Barychev et al. |
| 2015/0046098 | A1 | 2/2015 | Jack et al. |
| 2015/0086083 | A1 | 3/2015 | Chaudhry et al. |
| 2015/0128709 | A1 | 5/2015 | Stewart et al. |
| 2015/0138342 | A1 | 5/2015 | Brdar et al. |
| 2015/0185128 | A1 | 7/2015 | Chang et al. |
| 2015/0233714 | A1* | 8/2015 | Kim .............. G01C 17/38 33/356 |
| 2015/0253266 | A1 | 9/2015 | Lucon et al. |
| 2015/0314901 | A1 | 11/2015 | Murray et al. |
| 2016/0012588 | A1 | 1/2016 | Taguchi et al. |
| 2016/0043008 | A1 | 2/2016 | Murray et al. |
| 2016/0109283 | A1 | 4/2016 | Broussais-Colella et al. |
| 2016/0178532 | A1 | 6/2016 | Lim et al. |
| 2016/0241793 | A1 | 8/2016 | Ravirala et al. |
| 2016/0284098 | A1 | 9/2016 | Okumura et al. |
| 2016/0314571 | A1 | 10/2016 | Finn et al. |
| 2016/0328835 | A1 | 11/2016 | Maresca, Jr. et al. |
| 2016/0334284 | A1 | 11/2016 | Kaplun Mucharrafille et al. |
| 2017/0011503 | A1 | 1/2017 | Newman |
| 2017/0023505 | A1 | 1/2017 | Maione et al. |
| 2017/0052152 | A1 | 2/2017 | Tat et al. |
| 2017/0085760 | A1 | 3/2017 | Ernst et al. |
| 2017/0090458 | A1 | 3/2017 | Lim et al. |
| 2017/0122123 | A1 | 5/2017 | Kell et al. |
| 2017/0142302 | A1 | 5/2017 | Shaw et al. |
| 2017/0184469 | A1 | 6/2017 | Chang et al. |
| 2017/0184549 | A1 | 6/2017 | Reed et al. |
| 2017/0184650 | A1 | 6/2017 | Chang et al. |
| 2017/0211408 | A1 | 7/2017 | Ahmadian et al. |
| 2017/0219815 | A1 | 8/2017 | Letter et al. |
| 2017/0221274 | A1 | 8/2017 | Chen et al. |
| 2017/0234837 | A1 | 8/2017 | Hall et al. |
| 2017/0241286 | A1 | 8/2017 | Roberts et al. |
| 2017/0258391 | A1 | 9/2017 | Finn et al. |
| 2017/0262965 | A1 | 9/2017 | Xiong et al. |
| 2017/0262977 | A1 | 9/2017 | Finn et al. |
| 2017/0262979 | A1 | 9/2017 | Xiong et al. |
| 2017/0262985 | A1 | 9/2017 | Finn et al. |
| 2017/0262986 | A1 | 9/2017 | Xiong et al. |
| 2017/0270651 | A1 | 9/2017 | Bailey et al. |
| 2017/0297095 | A1 | 10/2017 | Zalameda et al. |
| 2017/0284971 | A1 | 11/2017 | Hall |
| 2018/0002039 | A1 | 1/2018 | Finn et al. |
| 2018/0005362 | A1 | 1/2018 | Wang et al. |
| 2018/0019097 | A1 | 1/2018 | Harada et al. |
| 2018/0098000 | A1 | 4/2018 | Park et al. |
| 2018/0111239 | A1 | 4/2018 | Zak et al. |
| 2019/0299542 | A1 | 10/2019 | Webb |
| 2019/0338666 | A1 | 11/2019 | Finn et al. |
| 2019/0339131 | A1 | 11/2019 | Finn et al. |
| 2019/0339206 | A1 | 11/2019 | Xiong et al. |
| 2019/0339207 | A1 | 11/2019 | Finn et al. |
| 2019/0339234 | A1 | 11/2019 | Finn et al. |
| 2019/0339235 | A1 | 11/2019 | Finn et al. |
| 2019/0340721 | A1 | 11/2019 | Finn et al. |
| 2019/0340742 | A1 | 11/2019 | Finn et al. |
| 2019/0340805 | A1 | 11/2019 | Xiong et al. |
| 2019/0342499 | A1 | 11/2019 | Xiong et al. |

FOREIGN PATENT DOCUMENTS

| | | |
|---|---|---|
| EP | 1961919 A2 | 8/2008 |
| GB | 2545271 A | 6/2017 |
| JP | 06235700 A | 8/1994 |
| JP | 2015161247 A | 9/2015 |
| SG | 191452 A1 | 7/2013 |
| WO | 2013088709 A1 | 6/2013 |
| WO | 2016112018 A1 | 7/2016 |
| WO | 2016123508 A1 | 8/2016 |
| WO | 2016176524 A1 | 11/2016 |

OTHER PUBLICATIONS

U.S. Non-Final Office Action dated May 28, 2019 for corresponding U.S. Appl. No. 15/971,214.
E. J. Candès, X. Li, Y. Ma, and J. Wright, "Robust Principal Component Analysis", submitted. http://www-stat.stanford.edu/~candes/papers/RobustPCA.pdf.
M. Sznaier, O. Camps, N. Ozay, T. Ding, G. Tadmor and D. Brooks, "The Role of Dynamics in Extracting Information Sparsely Encoded In High Dimensional Data Streams", in Dynamics of Information Systems, Hirsch, M.J.; Pardalos, P.M.; Murphey, R. (Eds.), pp. 1-28, Springer Verlag, 2010.
M. Fazel, H. Hindi, and S. Boyd, "A Rank Minimization Heuristic with Application to Minimum Order System Approximation", American Control Conference, Arlington, Virginia, pp. 4734-4739, Jun. 2001.
Meola et al., 'An Excursus on Infrared Thermography Imaging', J. Imaging 2016, 2, 36 http://www.mdpi.com/2313-433X/2/4/36/pdf.
Yu et al., 'ASIFT: An Algorithm for Fully Affine Invariant Comparison', Image Processing On Line on Feb. 24, 2011. http://www.ipol.im/pub/art/2011/my-asift/article.pdf.
Schemmel et al., 'Measurement of Direct Strain Optic Coefficient of YSZ Thermal Barrier Coatings at Ghz Frequencies', Optics Express, v.25, n.17, Aug. 21, 2017, https://doi.org/10.1364/OE.25.019968.
Jean-Yves Bouguet, "Camera Calibration Toolbox for Matlab", http://www.vision.caltech.edu/bouguetj/calib_doc/, accessed on Nov. 10, 2017.
https://www.qualitymag.com/articles/91976-from-human-to-machine-how-to-be-prepared-for-integration-of-automated-visual-inspection.
http://www.yxlon.com/products/x-ray-and-ct-inspection-systems/yxlon-mu56-tb.
Yu et al. 'Shadow Graphs and 3D Texture Reconstruction', IJCV, vol. 62, No. 1-2, 2005, pp. 35-60.
Blachnio et al, "Assessment of Technical Condition Demonstrated by Gas Turbine Blades By Processing of Images of Their Surfaces", Journal of KONBiN, 1(21), 2012, pp. 41-50.
Raskar et al., 'A Non-photorealistic Camera: Depth Edge Detection and Stylized Rendering using Multi-flash Imaging' ACM Transactions on Graphics, 2004 http://www.merl.com/publications/docs/TR2006-107.pdf.
Feris et al., 'Specular Reflection Reduction with Multi-Flash Imaging', 17th Brazilian Symposium on Computer Graphics and Image Processing, 2004. http://rogerioferis.com/publications/FerisSIB04.pdf.
Holland, "First Measurements from a New Broadband Vibrothermography Measurement System", AIP Conference Proceedings, 894 (2007), pp. 478-483. http://link.aip.org/link/doi/10.1063/1.2718010 \.
Gao et al., 'Detecting Cracks in Aircraft Engine Fan Blades Using Vibrothermography Nondestructive Evaluation', RESS Special Issue on Accelerated Testing, 2014, http://dx.doi.org/10.1016/j.ress.2014.05.009.
Gao et al., 'A Statistical Method for Crack Detection from Vibrothermography Inspection Data', Statistics Preprints. Paper 68. http://lib.dr.iastate.edu/stat_las_preprints/68.
Holland, 'Thermographic Signal Reconstruction for Vibrothermography', Infrared Physics & Technology 54 (2011) 503-511.
Li et al., 'Statistical Methods for Automatic Crack Detection Based on Vibrothermography Sequence-of-Images Data', Statistics Preprints. Paper 69. http://lib.dr.iastate.edu/stat_las_preprints/69.
Tian et al., 'A Statistical Framework for Improved Automatic Flaw Detection in Nondestructive Evaluation Images', Technometrics, 59, 247-261.
Henneke et al. 'Detection of Damage in Composite Materials by Vibrothermography', ASTM special technical publication (696), 1979, pp. 83-95.
http://www.npl.co.uk/commercial-services/sector-case-studies/thermal-imaging-reveals-the-invisible.
U.S. Non-Final Office Action dated Nov. 29, 2019 for corresponding U.S. Appl. No. 15/971,242.
U.S. Non-Final Office Action dated Mar. 5, 2019 for corresponding U.S. Appl. No. 15/971,227.

(56) References Cited

OTHER PUBLICATIONS

Gao et al., 'A Statistical Method for Crack Detection from Vibrothermography Inspection Data',(2010) Statistics Preprints. Paper 68. http://lib.dr.iastate.edu/stat_las_preprints/68.

Li1 Ming; Holland1 Stephen D.; and Meeker1 William Q.1 "Statistical Methods for Automatic Crack Detection Based on Vibrothermography Sequence-of-Images Data" (2010). Statistics Preprints. 69.

Henneke et al. 'Detection of Damage in Composite Materials by Vibrothermography', ASTM special technical publication (696), American Society For Testing and Materials, 1979, pp. 83-95.

http://www.npl.co.uk/commercial-services/sector-case-studies/thermal-imaging-reveals-the-invisible; Apr. 17, 2012.

Tian et al., 'A Statistical Framework for Improved Automatic Flaw Detection in Nondestructive Evaluation Images', Technometrics, 59, 247-261. Feb. 1, 2017.

Emmanuel J. Cand'es1,2, Xiaodong Li2, Yi MA3,4, and John Wright4, "Robust Principal Component Analysis", (1)Department of Statistics, Stanford University, Stanford, CA; (2)Department of Mathematics, Stanford University, Stanford, CA; (3, 4) Electrical and Computer Engineering, UIUC, Urbana, IL (4) Microsoft Research Asia, Beijing, China, Dec. 17, 2009.

Sebastien Parent; "From Human to Machine: HowTo Be Prepared for Integration of Automated Visual Inspection" Quality Magazine, https://www.qualitymag.com/articles/91976. Jul. 2, 2014.

http://www.yxlon.com/products/x-ray-and-ct-inspection-systems/yxlon-mu56-tb, 2016.

U.S. Office action dated Jul. 23, 2018 issued in corresponding U.S. Appl. No. 15/971,254.

U.S. Non-Final Office Action dated Apr. 16, 2019 for corresponding U.S. Appl. No. 15/970,985.

U.S. Final Office Action dated Jan. 3, 2019 for corresponding U.S. Appl. No. 15/971,254.

U.S. Non-Final Office Action dated Apr. 30, 2020 issued for corresponding U.S. Appl. No. 15/970,944.

U.S. Non-Final Office Action dated Feb. 25, 2020 for corresponding U.S. Appl. No. 15/971,214.

U.S. Non-Final Office Action dated Aug. 27, 2020 issued for corresponding U.S. Appl. No. 15/970,944.

U.S. Non-Final Office Action dated May 21, 2020 issued for corresponding U.S. Appl. No. 15/971,236.

U.S. Non-Final Office Action dated Jun. 23, 2020 issued for corresponding U.S. Appl. No. 15/971,205.

U.S. Non-Final Office Action dated Jul. 28, 2020 issued for corresponding U.S. Appl. No. 15/971,214.

U.S. Notice of Allowance dated Oct. 19, 2020 issued for corresponding U.S. Appl. No. 15/971,270.

\* cited by examiner

SYSTEM AND METHOD FOR FAN BLADE ROTOR DISK AND GEAR INSPECTION

BACKGROUND

The present disclosure is directed to an automated optical inspection system. Particularly, the disclosure is directed to an automated optical inspection system for machinery components with particular application to turbine fan blades, turbine blades, turbine disks, turbine vane assemblies, and turbine gears, using image, video, or 3D sensing and damage detection analytics. Even more particularly, the turbine may be a gas turbine for power generation, air craft auxiliary power, aircraft propulsion, and the like.

Gas turbine engine components, such as blades and vanes, may suffer irregularities from manufacturing or wear and damage during operation, for example, due to erosion, hot corrosion (sulfidation), cracks, dents, nicks, gouges, and other damage, such as from foreign object damage. Other gas turbine engine components, such as rotor disks and gears, may suffer irregularities from manufacturing or damage from use, for example, such as wear, fretting and fatigue cracking. Detecting this damage may be achieved by images, videos, or 3D sensing for aircraft engine blade inspection, power turbine blade inspection, aircraft engine disk inspection, aircraft engine vane assembly inspection, gear inspection, internal inspection of mechanical devices, and the like. A variety of techniques for inspecting by use of images, videos, or 3D sensing may include capturing and displaying images, videos, or 3D data to human inspectors for manual defect detection and interpretation. Human inspectors may then decide whether any defect exists within those images, videos, or 3D data. When human inspectors look at many similar images, videos, or 3D data of very similar blades, vanes, slots, gear teeth, and the like of an engine stage, or any like subcomponents of a device, they may not detect defects, for example, because of fatigue or distraction experienced by the inspector. Missing a defect may lead to customer dissatisfaction, transportation of an expensive engine back to service centers, lost revenue, or even engine failure. Additionally, manual inspection of components may be time consuming and expensive.

SUMMARY

In accordance with the present disclosure, there is provided system for component inspection comprising at least one sensor configured to capture sensor data of the component; and a processor coupled to the at least one sensor, the processor comprising at least one model configured to separate the sensor data into a normal category and an abnormal category.

In another and alternative embodiment, the model comprises at least one of a statistical model, an empirical model, a learned model, a prior condition model, and a design model.

In another and alternative embodiment, the system further comprises a tangible, non-transitory memory configured to communicate with the processor, the tangible, non-transitory memory having instructions stored therein that, in response to execution by the processor, cause the processor to perform operations comprising: receiving, by the processor, sensor data for the component from the at least one sensor; organizing, by the processor, the sensor data into a matrix, wherein each frame of the sensor data comprises a single column in the matrix; separating, by the processor, the matrix into at least one of a low-rank part and a sparse part, wherein a linear combination of the low-rank part columns represents an undamaged component; and determining, by the processor, defects in the component based on the sparse part.

In another and alternative embodiment, the at least one sensor comprises an optical system configured for high spatial resolution and large depth of field.

In another and alternative embodiment, the system further comprises a tangible, non-transitory memory configured to communicate with the processor, the tangible, non-transitory memory having instructions stored therein that, in response to execution by the processor, cause the processor to perform operations comprising: receiving, by the processor, sensor data for the component from the at least one sensor; organizing, by the processor, the sensor data into a tensor, wherein each frame of the sensor data comprises a lower-dimensional portion in the tensor; separating, by the processor, the tensor into at least one of a normal part and an abnormal part, wherein a linear combination of the normal part represents an undamaged component; and determining, by the processor, defects in the component based on the abnormal part.

In another and alternative embodiment, the at least one sensor comprises a depth sensing system configured for high spatial resolution and large range.

In another and alternative embodiment, the processor modifies the sensor data according to a dynamic model of rotational motion during inspection.

In another and alternative embodiment, the processor comprises instructions selected from the group consisting of a Bayesian estimation, a support vector machine (SVM), a decision tree, deep neural network, recurrent ensemble learning machine, and comparison to a threshold.

In another and alternative embodiment, the component comprises radially arranged, substantially similar subcomponents.

In another and alternative embodiment, the component is selected from the group consisting of a gas turbine engine disk, a vane assembly, a gear, and a fan.

In accordance with the present disclosure, there is provided a method for inspection of a component, comprises aligning at least one sensor to capture sensor data of a component; coupling a processor to the at least one sensor, the processor comprising at least one model; and separating the sensor data into a normal category and an abnormal category.

In another and alternative embodiment, the processor performs operations comprises receiving sensor data for the component from the at least one sensor; organizing the sensor data into a matrix, wherein each frame of the sensor data comprises a single column in the matrix; separating the matrix into at least one of a low-rank part and a sparse part, wherein a linear combination of the low-rank part columns represents an undamaged component; and determining defects in the component based on the sparse part.

In another and alternative embodiment, the processor performs operations comprising receiving sensor data for the component from the at least one sensors; organizing the sensor data into a tensor, wherein each frame of the sensor data comprises a lower-dimensional portion in the tensor; separating the tensor into at least one of a normal part and an abnormal part, wherein a linear combination of the normal part represents an undamaged component; and determining defects in the component based on the abnormal part.

In another and alternative embodiment, the at least one sensor comprises an optical system configured for high spatial resolution and large depth of field.

In another and alternative embodiment, the at least one sensor comprises a depth sensing system configured for high spatial resolution and large range.

In another and alternative embodiment, the at least one model comprises at least one of a statistical model, an empirical model, a learned model, a prior condition model, and a design model.

In another and alternative embodiment, the processor modifies the sensor data according to a dynamic model of rotational motion during inspection.

In another and alternative embodiment, the processor comprises instructions selected from the group consisting of a Bayesian estimation, a support vector machine (SVM), a decision tree, deep neural network, recurrent ensemble learning machine, and comparison to a threshold.

A specifically designed camera system comprising a focal plane array (FPA), aperture, and optics is aligned to simultaneously image the pressure face of an entire broached slot or gear tooth at high resolution and in sharp focus. The automated optical inspection system utilizes image analytics using one or more images to detect machining or operational damage. When using one image, the inspection system utilizes one or more of image enhancement, edge detection, frame differencing from a known-good image (or model), and the like, wherein the frame differencing includes one or more of registration, cross correlation, normalization, and the like. The image enhancement may include one or more of histogram equalization, glare reduction, morphological filtering, and the like.

When using more than one image, the disk, gear, fan blade assembly, vane assembly, or component may be rotated and multiple images are taken at different rotation angles. The automated optical inspection system may then utilize Robust Principle Components Analysis (RPCA) optionally with low-order dynamic models of rotational motion during inspection, and statistical image analysis to automatically detect possible defects. RPCA organizes the images/video frames in a matrix D, where each image/frame is one column, and then separates D into a low-rank part A and sparse part E (the matrix A essentially captures a non-damage model of the component under inspection and the damaged component, if any, is in the residual matrix E). The sparse part contains possible defects. The low-rank part is determined by the minimizing the matrix nuclear norm which is the convex relaxation of rank Other details of the automated optical inspection system are set forth in the following detailed description and the accompanying drawings wherein like reference numerals depict like elements.

DETAILED DESCRIPTION

Figure 1:
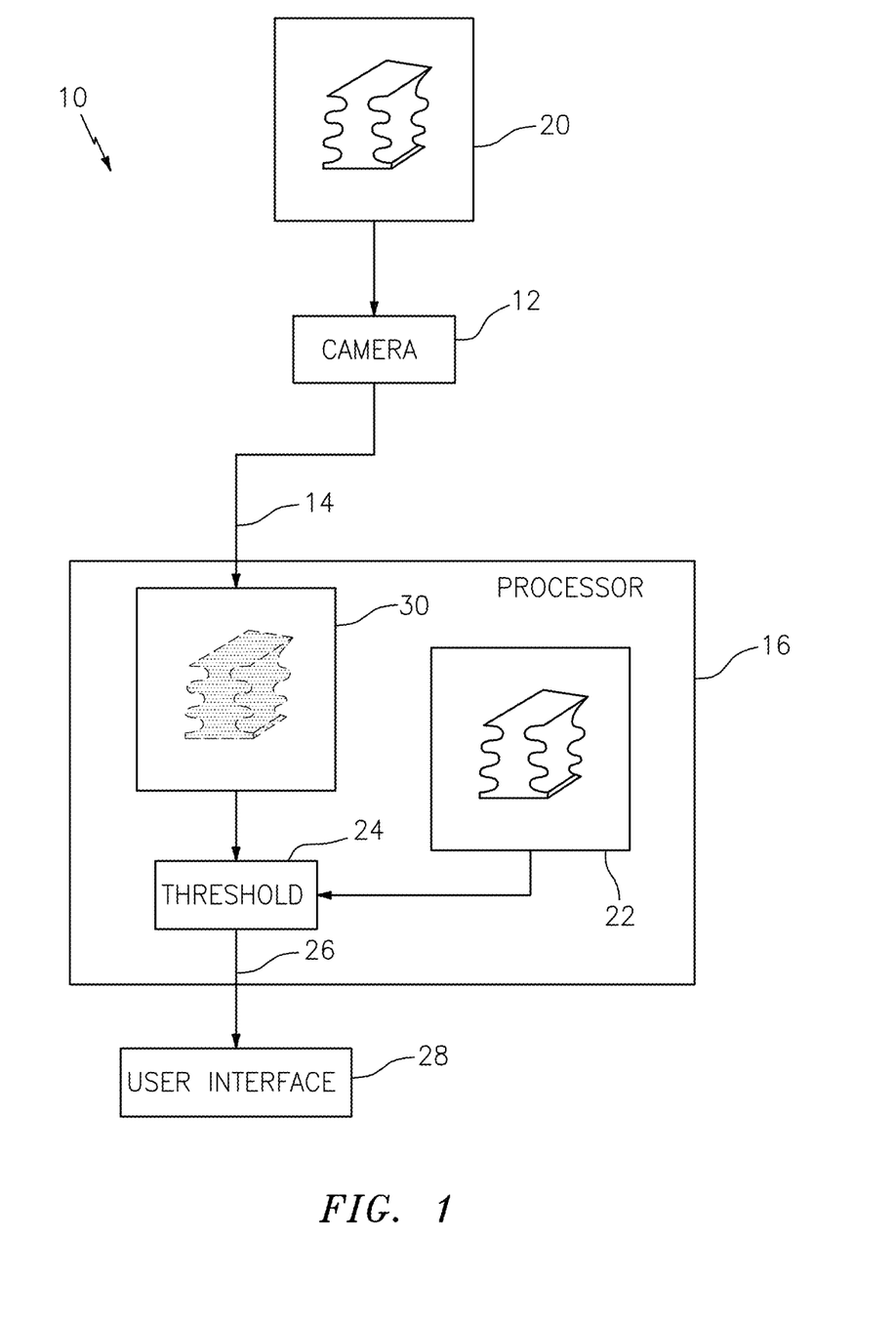
FIG. 1 is a schematic diagram of an exemplary inspection system in accordance with various embodiments.

Referring to FIG. 1, a schematic illustration of an automated inspection system 10 for detecting a defect or damage to a component 20 is shown, in accordance with various embodiments. Component 20 of FIG. 1 depicts one of many broached slots arranged radially around the periphery of an exemplary turbine engine disk (not depicted). Inspection system 10 may be configured to perform imaging of a component 20. Component 20 may include a component on an aircraft, such as an engine component, such as a fan blade, a turbine blade, a turbine vane assembly, a disk, or a gear. Component 20 may be scanned or sensed by one or more sensors 12 to obtain data 14 about the component 20. Data 14 may be obtained, for example, from a specialized camera system configured to obtain high resolution and large depth of field. In various embodiments, data 14 may be obtained by rotating, panning, or positioning the sensor(s) 12 relative to the component 20 to capture data 14 from multiple viewpoint angles, perspectives, and/or depths. Further, the component 20 may be rotated or positioned relative to the sensor(s) 12 to obtain data 14 from multiple viewpoints, perspectives, and/or depths. This is particularly beneficial when component 20 comprises radially arranged subcomponents such as airfoils in a fan or vane assembly, slots in a disk, teeth in a gear, and the like. The rotation of component 20 may be such that a like spatial relationship of a subcomponent to sensor(s) 12 is achieved prior to capturing data. An array of sensors 12 positioned around component 20 may be used to obtain data 14 from multiple viewpoints. Thus, either of the sensor(s) 12 or component 20 may be moved or positioned relative to the other and relative to various directions or axes of a coordinate system to obtain sensor information from various viewpoints, perspectives, and/or depths. Further, sensor 12 may scan, sense, or capture information from a single position relative to component 20.

In an exemplary embodiment, the sensor 12 can be a one-dimensional (1D), 2D, or 3D camera or camera system; a 1D, 2D, or 3D depth sensor or depth sensor system; and/or a combination and/or array thereof. Sensor 12 may be operable in the electromagnetic or acoustic spectrum capable of producing a point cloud, occupancy grid or depth map of the corresponding dimension(s). Sensor 12 may provide various characteristics of the sensed electromagnetic or acoustic spectrum including intensity, spectral characteristics, polarization, etc. In various embodiments, sensor 12 may include a distance, range, and/or depth sensing device. Various depth sensing sensor technologies and devices include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, echolocation, laser radar, scanning light detection and ranging (LIDAR), flash LIDAR, or a combination comprising at least one of the foregoing. Different technologies can include active (transmitting and receiving a signal) or passive (only receiving a signal) and may operate in a band of the electromagnetic or acoustic spectrum such as visual, infrared, ultrasonic, etc. In various embodiments, sensor 12 may be operable to produce depth from defocus, a focal stack of images, or structure from motion.

In various embodiments, sensor 12 may include a structured light line sensor, a linear image sensor, or other 1D sensor. Further, sensor 12 may include a 2D sensor, and inspection system 10 may extract 1D information from the 2D sensor data. 2D data 14 may be synthesized by processor 16 from multiple 1D data 14 from a 1D sensor 12 or from multiple 1D data 14 extracted from a 2D sensor 12. The extraction of 1D data 14 from 2D data 14 may include retaining only data that is in focus. Even further, sensor 12 may include a position and/or orientation sensor such as an inertial measurement unit (IMU) that may provide position and/or orientation information about component 20 with respect to a coordinate system or sensor 12. The position and/or orientation information may be beneficially employed in synthesizing 2D data from 1D data, or in aligning 1D, 2D or 3D information to a reference model as discussed elsewhere herein.

Data 14 from sensor(s) 12 may be transmitted to one or more processors 16 (e.g., computer systems having a central processing unit and memory) for recording, processing and storing the data received from sensors 12. Processor 16 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof. Processor 16 may be in communication (such as electrical communication) with sensors 12 and may be configured to receive input, such as images and/or depth information from sensors 12. Processor 16 may receive data 14 about component 20 captured and transmitted by the sensor(s) 12 via a communication channel. Upon receiving the data 14, the processor 16 may process data 14 from sensors 12 to determine if damage or defects are present on the component 20.

In various embodiments, processor 16 may receive or construct image or 3D information 30 corresponding to the component 20. The construction of 3D information from 1D or 2D information may include tiling, mosaicking, stereopsis, structure from motion, structure from multiple viewpoints, simultaneous localization and mapping, and the like. Processor 16 may further include a reference model 22 stored, for example, in memory of processor 16. Reference model 22 may be generated from a CAD model, and/or information, such as from a scan or information of an original component or an undamaged component. Reference model 22 may be a theoretical model or may be based on historical or current information about component 20. In particular, reference model 22 may be derived from the current image data 14. Reference model 22 may be adjusted and updated as component 20 and/or similar components are scanned and inspected. Thus, reference model 22 may be a learned model of a component and may include, for example, information including shape and surface features of the component.

In various embodiments, processor 16 of inspection system 10 may classify the damage and determine the probability of damage and/or if the damage meets or exceeds a threshold 24. Threshold 24 may be an input parameter, may be based on reference model 22, may be from user input, and the like. Processor 16 may provide an output 26 to a user interface 28 indicating the status of the component 20. User interface 28 may include a display. Inspection system 10 may display an indication of the defect to component 20, which may include an image and/or a report. In addition to reporting any defects in the component, output 26 may also relay information about the type of defect, the location of the defect, size of the defect, etc. If defects are found in the inspected component 20, an indicator may be displayed on user interface 28 to alert personnel or users of the defect.

Figure 2:
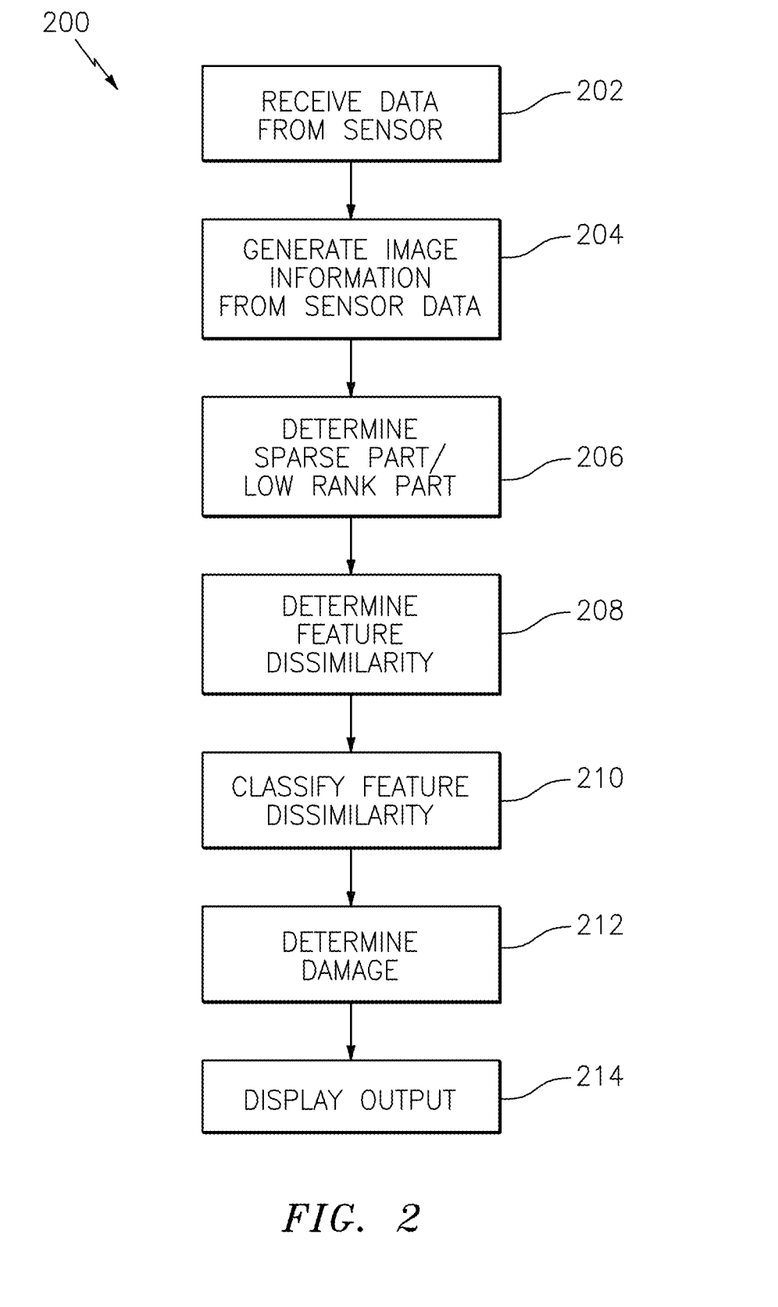
FIG. 2 is a process map of an exemplary inspection system in accordance with various embodiments.

With reference to FIG. 2, a method 200 for detecting defects is provided, in accordance with various embodiments. Processor 16 may be capable of carrying out the steps of FIG. 2. One or more sensors 12 may capture data about a component 20. Method 200, performed by processor 16 of inspection system 10, may include receiving data from a sensor/camera (step 202). Method 200 may include generating information from the sensor data (step 204). The information may correspond to the component. Method 200 may include determining a sparse part and a low-rank part of the sensor data (step 206). Step 206 may further include aligning the sensor data or information with a reference model. Method 200 may further include determining a feature dissimilarity between the information and the reference model (step 208), classifying the feature dissimilarity (step 210), determining damage (step 212), and displaying an output (step 214).

Step 202 may further comprise receiving 1D or 2D data, from a sensor 12. In various embodiments, information is received from one or more sensors 12, which may be sensors. In receiving data 14 from a sensor, the inspection system 10 may capture depth points of component 20 and recreate precisely, the actual surfaces of component 20, thereby generating a complete point cloud or a partial point cloud. In an exemplary embodiment, the entire forward surface of a gas turbine engine fan blade can be captured.

Step 204 may comprise producing a point cloud or occupancy grid, a partial point cloud, a model derived from a point cloud, depth map, other depth information, 1D information, and/or 2D information. A point cloud or occupancy grid may include a plurality of points or coordinates in a coordinate system having three dimensions, such as an xyz coordinate system or polar coordinate system. A partial point cloud may include a plurality of points or coordinates in a coordinate system, where the sensor data is collected from a single viewpoint or a limited set of viewpoints. A model derived from a point cloud may include a modified point cloud which has been processed to connect various points in the point cloud in order to approximate or functionally estimate the topological surface of the component. A depth map may reflect points from a point cloud that can be seen from a particular viewpoint. A depth map may be created by assuming a particular viewpoint of a point cloud in the coordinate system of the point cloud.

Step 204 may further comprise constructing a complete image or point cloud of the component 20 by mosaicking information from multiple sensors 12 or multiple viewpoints. Step 204 may comprise merging data 14 from multiple viewpoints. In various embodiments, step 204 may comprise merging a first data from a 1D sensor and a second data from a 2D sensor and processing the 1D and 2D data to produce information 30.

In various embodiments, step 204 may comprise computing first data from a first 2D sensor and second data from a second 2D sensor. Processor 16 may receive a plurality of 2D sensor data and merge the 2D sensor data to generate a focal stack of 2D sensor data. The focal stack, i.e. multiple layers of 2D sensor data, may produce a volume of data to form the information 30, which may be a representation of the component.

Step 206 may further comprise of aligning the information, such as a point cloud, by an iterative closest point (ICP) algorithm modified to suppress misalignment from damage areas of the component 20. The alignment may be performed by an optimization method, i.e., minimizing an objective function over a dataset, which may include mathematical terms in the ICP objective function or constraints to reject features or damage as outliers. The alignment may be performed by a modification to a random sample consensus (RANSAC) algorithm, scale-invariant feature transform (SIFT), speeded up robust feature (SURF), or other suitable alignment method. Step 206 may further include comparing the 3D information 30 to the reference model 22 to align the features from the information 30 with the reference model 22 by identifying affine and/or scale invariant features, diffeomorphic alignment/scale cascaded alignment, and the like. Step 206 may further include registering the features.

Step 208 may further comprise computing features, such as surface and shape characteristics, of the component 20 by methods to identify and extract features. For example, processor 16 may determine differences or dissimilarities between the information 30 and the reference model 22. Step 208 may further comprise identifying features and determining differences or dissimilarities between the identified features in the information 30 and the reference model 22 using a statistical algorithm such as a histogram of oriented gradients in 2D or 3D (HoG, HoG3D), 3D Zernike moments, or other algorithms. In a HoG3D method, processor 16 may define the orientation of edges and surfaces of 3D information 30 by dividing the 3D information 30 into portions or cells and assigning to each cell a value, where each point or pixel contributes a weighted orientation or gradient to the cell value. By grouping cells and normalizing the cell values, a histogram of the gradients can be produced and used to extract or estimate information about an edge or a surface of the component 20. Thus, the features of the information 30, such as surface and edge shapes, may be identified. Other algorithms, such as 3D Zernike moments, may similarly be used to recognize features in 3D information 30 by using orthogonal moments to reconstruct, for example, surface and edge geometry of component 20. Step 208 may further comprise determining differences or dissimilarities between the identified features in the 3D information 30 and the reference model 22. The dissimilarities may be expressed, for example, by the distance between two points or vectors. Other approaches to expressing dissimilarities may include computing mathematical models of information 30 and reference model 22 in a common basis (comprising modes) and expressing the dissimilarity as a difference of coefficients of the basis functions (modes). Differences or dissimilarities between the 3D information 30 and the reference model 22 may represent various types of damage to component 20.

Step 210 may further comprise classifying the feature dissimilarities identified in step 208. The inspection system 10 may include categories of damage or defect types for component 20. For example, damage may be categorized into classes such as warping, stretching, edge defects, erosion, nicks, cracks, and/or cuts. Step 210 may further comprise identifying the damage type based on the dissimilarities between the information 30 and the reference model 22. Step 210 may further comprise classifying the feature dissimilarities into categories of, for example, systemic damage or localized damage. Systemic damage may include warping or stretching of component 20. Localized damage may include edge defects, erosion, nicks, cracks, or cuts on a surface of component 20. Classifying the feature dissimilarities may be accomplished by, for example, a Bayesian estimation, support vector machine (SVM), decision tree, deep neural network, recurrent ensemble learning machine, or other classification method.

Step 212 may further comprise determining whether the feature difference or dissimilarity represents damage to component 20. Step 212 may comprise determining a probability of damage represented by the feature dissimilarity and/or classification. Step 212 may comprise determining damage by comparing the probability of damage to a threshold. Damage may be determined if the probability meets or exceeds a threshold. The inspection system 10 may determine if the damage is acceptable or unacceptable, and may determine if the component 20 should be accepted or rejected, wherein a rejected component would indicate that the component should be repaired or replaced.

Step 214 may further comprise storing, transmitting or displaying the information, feature differences or dissimilarities, classification of the feature differences or dissimilarities, a damage report, and/or a determination or recommendation that the component 20 be accepted or rejected. Step 214 may further comprise displaying an image, a model, a combined image and 3D model, a 2D perspective from a 3D model, and the like, of the damaged component for further evaluation by a user or by a subsequent automated system.

Figure 3:
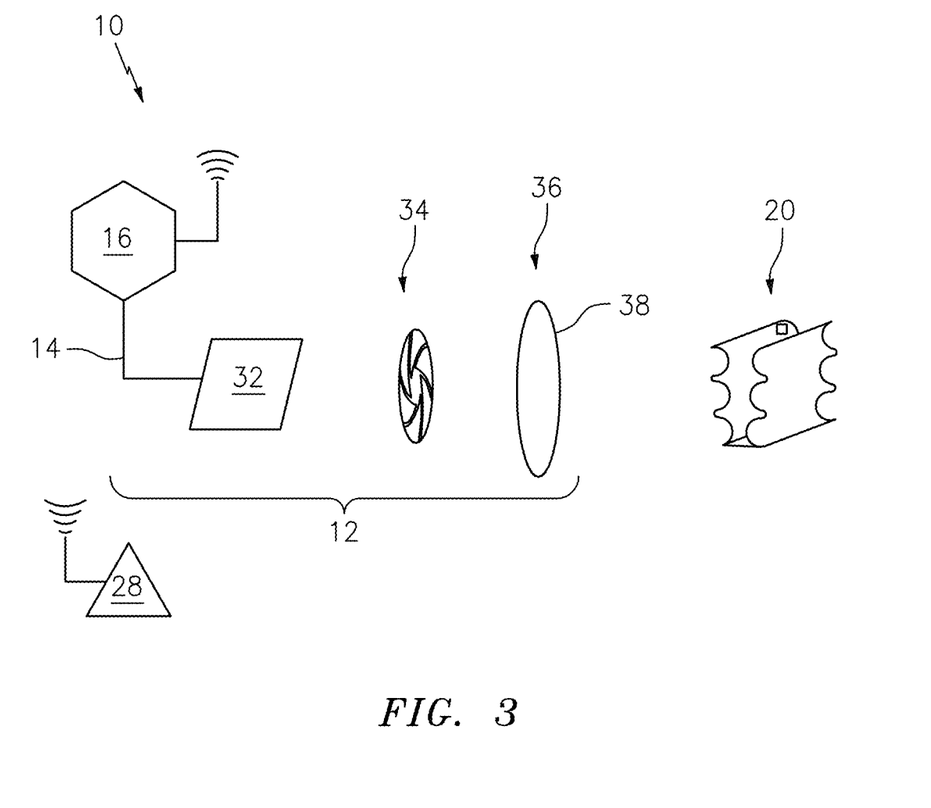
FIG. 3 is a schematic diagram of an exemplary disk inspection system.
Figure 4A:
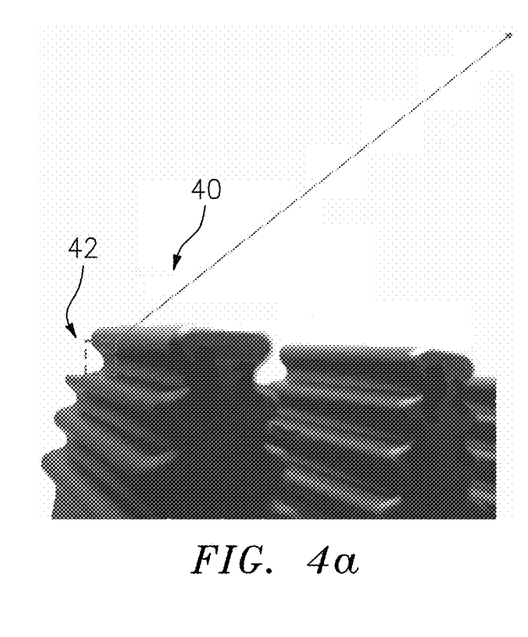
FIGS. 4a-4d illustrate exemplary camera imagery, a disk shape model, and statistical analysis to detect damage.
Figure 4B:
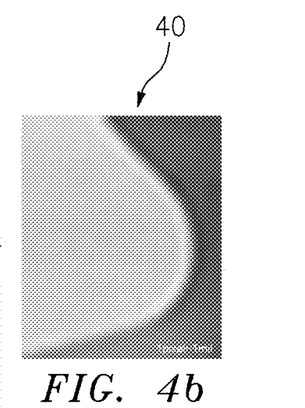
Figure 4C:
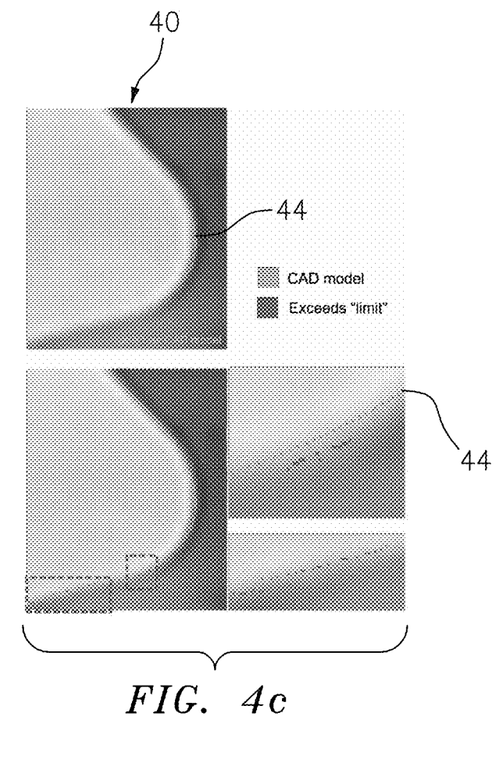
Figure 4D:
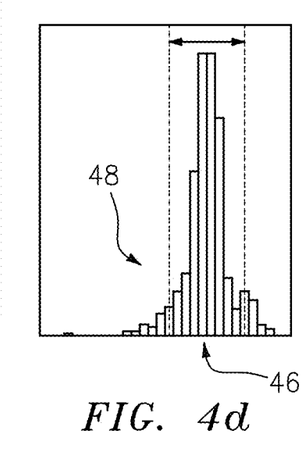

Referring also to FIG. 3 an exemplary automated optical inspection system 10 can be seen. In another exemplary embodiment, the system 10 can include an optical system for a gas turbine engine disk inspection. The component 20 can be a disk, a gear, and the like. The exemplary embodiment shown in FIG. 3 includes a broached slot of a disk as the component 20. The sensor 12 is shown as a camera system 12 configured to capture images of disk 20. The camera system 12 can be fixed or mobile, such that the camera can move, pan, slide or otherwise reposition to capture the necessary image data 14 of the disk 20. The camera system 12 can comprise a focal plane array (FPA) 32 coupled to an aperture 34 and optics 36 aligned to image the disk 20. In an exemplary embodiment, the optics 36 can be a lens or lens system 38. In some embodiments it may be desirable that camera system 12 resolve 0.2 mils/pixel (5 microns/pixel) with a depth of field of 1300 mils (33 millimeters). Using a typical DSLR camera (Canon EOS 7D with an 18 Mpixels 14.9 mm×22.3 mm FPA using a lens stopped down to f32 at a subject distance of 1 meter) would be inadequate because the depth of field would only be approximately 12 mm. Depth of field improves with subject distance, but resolution decreases. Depth of field improves with increasing f#, but available light decreases. A custom-designed optical system with a large FPA (50 Mpixels) and longer standoff distance (1.65 meters), still at f32, may achieve the desired performance. An equivalent structured-light 3D depth sensing system 12 has the same performance parameters and requires an equivalent custom design.

The inspection system 10 can include a processor 16 coupled to the camera system 12. The processor 16 can be configured to determine defects or damage to the gas turbine engine disk 20 based on video analytics. The processor 16 is shown with a transceiver configured to communicate wirelessly with the user interface 28. In another exemplary embodiment the system can be hard wired. The processor 16 can be configured to automatically report damage and archive the damage for trending and condition-based-maintenance.

The processor 16 can be configured to receive the data for the gas turbine engine disk 20 from the camera system 12. The processor 16 can include a Robust Principle Components Analysis program. The processor 16 can include a low-order dynamic model of rotational motion during inspection, and statistical image analysis to automatically detect possible defects. The low-order dynamic model may be used to align (register) imagery taken at different rotation angles to achieve imagery of substantially the same appearance. The processor 16 can include a program configured to determine a low-rank part, (i.e., a model of a component without damage) by minimizing a matrix nuclear norm.

Referring also to FIG. 4 including 4a-4d, an image 40 of an exemplary broached slot 42 can be seen at 4a. FIG. 4b is a higher magnification image of the slot 42 taken from the image of 4a. FIG. 4c shows images of the actual image 40 compared with a model 44 of an undamaged disk slot. As described above, the model 44 can be generated through various techniques. The image at 4c also highlights portions of the broached slot 42 that may exceed a limit as determined by the processor 16 and the various programs for damage detection described above. FIG. 4d illustrates the exemplary statistical damage analysis 46. The statistical damage analysis 46 represents the empirical probability density function (pdf) of the minimum distance from an image pixel to the model 44. Then the distance exceeds a threshold (two standard deviations as depicted as "OK" in FIG. 4d) the corresponding surface is determined to be damaged.

In an exemplary embodiment, 2D images from the camera system 12 can be reorganized into a 1D vector by concatenating successive columns of the image. The resulting vector becomes one column of an image matrix D as explained further below. Successive images, then, become successive columns of the image matrix D. Since an image typically has 1 million pixels, or more, and the number of images taken while rotating the component under inspection is typically only a few hundred or thousand, the matrix is typically much taller than it is wide.

Robust Principal Component Analysis (RPCA) can be applied to decompose an image matrix D into a nominally low-rank or "normal" matrix component, A, and a sparse matrix component, E. The RPCA algorithm may be applied according to the method in E. Candés, X. Li, Y. Ma, and J. Wright entitled "Robust principal component analysis?" (*Journal of the ACM*, 58(3), May 2011). The matrix A captures the normal appearance of the broached slots 42, and the sparse matrix component E contains images of possible damage. The decomposition is formulated to minimize a weighted combination of a nuclear norm of the matrix A, and of the $l_1$ norm of the sparse component, E according to Equations (1) and (2).

$$\text{minimize} \|A\|_* + \lambda \|E\|_1 \quad (1)$$

$$\text{subject to } D = A + E \quad (2)$$

where: $\|A\|_*$ denotes the nuclear norm of the matrix (i.e., sum of its singular values); $\|E\|$ denotes the sum of the absolute values of matrix entries; and $\lambda$ is a parameter that balances rank and sparsity. In the exemplary embodiment described herein the "low-rank part" may, in fact, not actually low rank under the described circumstances. Nevertheless, the matrix A essentially captures a non-damage model of the component under inspection and the damaged component, if any, is in the residual matrix E.

In an embodiment wherein 3D (depth) data from sensor(s) 12 comprises a frame of depth information arranged as 2-dimensional (u,v) depth matrix, the RPCA process may be used as described elsewhere herein. In an alternative embodiment wherein the 3D (depth) data from sensor(s) 12 comprises a frame of depth information arranged as a 3-dimensional (x,y,z) depth tensor, for example as an occupancy grid, a tensor-based extension of the matrix-based RPCA process may be used. In this case, the sensor frames may be arranged as successive 3-dimensional sub-arrays of a 4-dimensional tensor. The 4-dimensional tensor may be decomposed into a normal part (a linear combination of which may represent a normal 3-dimensional model of a component) and an abnormal part which captures damage (any part of the data that is not representable by the normal part). In an alternative embodiment, the 3-dimensional depth data may be reduced in dimension by successively appending columns of data along one dimension into a single long column. Performing this process reduces the 3-dimensional frame to a 2-dimensional frame which may be used in the RPCA process described elsewhere herein.

There has been provided an automated optical inspection system. While the automated optical inspection system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A system for component inspection comprising:
   at least one sensor configured to capture sensor data of the component wherein said sensor includes a position and/or orientation sensor;
   a processor coupled to said at least one sensor,
   said processor comprising at least one model configured to separate said sensor data into a normal category and an abnormal category;
   wherein said model comprises at least one of a statistical model, an empirical model, a prior condition model, and a design model; and
   a tangible, non-transitory memory configured to communicate with said processor, the tangible, non-transitory memory having instructions stored therein that, in response to execution by the processor, cause the processor to perform operations comprising:
   receiving, by the processor, sensor data for said component from said at least one sensor;
   organizing, by the processor, the sensor data into a matrix, wherein each frame of said sensor data comprises a single column in said matrix;
   separating, by the processor, said matrix into at least one of a low-rank part and a sparse part,
   wherein a linear combination of the low-rank part columns represents an undamaged component; and
   determining, by the processor, defects in the component based on the sparse part, using a reference model in the absence of a reference image,
   wherein said model comprises said reference model generated from a CAD model.

2. The system for component inspection of claim 1, wherein said at least one sensor comprises an optical system configured for high spatial resolution and large depth of field.

3. The system for component inspection of claim 1, further comprising a tangible, non-transitory memory configured to communicate with said processor, the tangible, non-transitory memory having instructions stored therein that, in response to execution by the processor, cause the processor to perform operations comprising:
   receiving, by the processor, sensor data for said component from said at least one sensor;
   organizing, by the processor, the sensor data into a tensor, wherein each frame of said sensor data comprises a lower-dimensional portion in said tensor;
   separating, by the processor, said tensor into at least one of a normal part and an abnormal part, wherein a linear combination of the normal part represents an undamaged component; and
   determining, by the processor, defects in the component based on the abnormal part.

4. The system for component inspection of claim 1, wherein said at least one sensor comprises a depth sensing system configured for high spatial resolution and large range.

5. The system for component inspection of claim 1, wherein said processor modifies said sensor data according to a dynamic model of rotational motion during inspection.

6. The system for component inspection of claim 1, wherein said processor comprises instructions selected from the group consisting of a Bayesian estimation, a support vector machine (SVM), a decision tree, deep neural network, recurrent ensemble learning machine, and comparison to a threshold.

7. The system for component inspection of claim 1, wherein said component comprises radially arranged, substantially similar subcomponents.

8. The system for component inspection of claim 1, wherein said component is selected from the group consisting of a gas turbine engine disk, a vane assembly, a gear, and a fan.

9. A method for inspection of a component, comprising:
aligning at least one sensor to capture sensor data of a component obtained by rotating, panning, or positioning the at least one sensor relative to the component to capture data from multiple viewpoint angles, perspectives, and/or depths;
coupling a processor to said at least one sensor, said processor comprising at least one model wherein said at least one model comprises at least one of a statistical model, an empirical model, a prior condition model, and a design model;
separating said sensor data into a normal category and an abnormal category; and
wherein said processor performs operations comprising:
receiving sensor data for said component from said at least one sensor;
organizing the sensor data into a matrix, wherein each frame of said sensor data comprises a single column in said matrix;
separating said matrix into at least one of a low-rank part and a sparse part, wherein a linear combination of the low-rank part columns represents an undamaged component; and
determining defects in the component based on the sparse part using a reference model in the absence of a reference image,
wherein said at least one model comprises said reference model generated from a CAD model.

10. The method for inspection of a component of claim 9, wherein said processor performs operations comprising:
receiving sensor data for said component from said at least one sensors;
organizing the sensor data into a tensor, wherein each frame of said sensor data comprises a lower-dimensional portion in said tensor;
separating said tensor into at least one of a normal part and an abnormal part, wherein a linear combination of the normal part represents an undamaged component; and
determining defects in the component based on the abnormal part.

11. The method for inspection of a component of claim 9, wherein said at least one sensor comprises an optical system configured for high spatial resolution and large depth of field.

12. The method for inspection of a component of claim 9, wherein said at least one sensor comprises a depth sensing system configured for high spatial resolution and large range.

13. The method for inspection of a component of claim 9, wherein said processor modifies said sensor data according to a dynamic model of rotational motion during inspection.

14. The method for inspection of a component of claim 9, wherein said processor comprises instructions selected from the group consisting of a Bayesian estimation, a support vector machine (SVM), a decision tree, deep neural network, recurrent ensemble learning machine, and comparison to a threshold.

15. The method for inspection of a component of claim 9, wherein said component comprises radially arranged, substantially similar subcomponents.

16. The method for inspection of a component of claim 9, wherein said component is selected from the group consisting of a gas turbine engine disk, a vane assembly, a gear, and a fan.

* * * * *